US007740372B2

(12) United States Patent
Sohn (10) Patent No.: US 7,740,372 B2
(45) Date of Patent: Jun. 22, 2010

(54) BACKLIGHT UNIT AND LIQUID CRYSTAL DISPLAY USING THE SAME

(75) Inventor: Jeongwoo Sohn, Gumi-Si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/318,570

(22) Filed: Dec. 31, 2008

(65) Prior Publication Data

US 2009/0207588 A1    Aug. 20, 2009

(30) Foreign Application Priority Data

Feb. 18, 2008    (KR) ...................... 10-2008-0014657

(51) Int. Cl.
*F21V 33/00*    (2006.01)
(52) U.S. Cl. ...................... 362/225; 362/238; 362/240; 362/219; 362/217.09
(58) Field of Classification Search ............ 362/249.01, 362/238, 240, 219, 217.08, 217.09, 217.14, 362/217.1, 225, 97.4
See application file for complete search history.

(56) References Cited

U.S. PATENT DOCUMENTS

2005/0162868 A1* 7/2005 Kim ........................... 362/632
2007/0139962 A1* 6/2007 Han ........................... 362/613
2007/0157487 A1* 7/2007 Hyun et al. ................. 36/118.9

* cited by examiner

*Primary Examiner*—Laura Tso
(74) *Attorney, Agent, or Firm*—McKenna Long & Aldridge LLP (57) ABSTRACT

A backlight unit includes a plurality a plurality of lamps, each having a first electrode and a second electrode. An alternating current (AC) signal having a high voltage is intermittently applied to the first electrode and the second electrode is connected to a ground. The backlight unit also includes: a pair of lamp guides comprising a first lamp guide and a second lamp guide, wherein the first lamp guide supports the lamps and is disposed to cross the lamps near the first electrodes, and the second lamp guide is disposed to cross the lamps near the second electrodes; a bottom cover for accommodating the lamps and the lamp guide pair; and a plurality of shock-absorbing holes formed in a bottom surface of the bottom cover near the first electrodes, a length of each shock-absorbing hole extending parallel to a corresponding one of the lamps.

6 Claims, 8 Drawing Sheets

FIG. 1

(Related Art)

FIG. 2

(Related Art)

FIG. 3

(Related Art)

$$\text{Duty Ratio} = \frac{\text{Ton}}{\text{Ton} + \text{Toff}} \times 100$$

FIG. 4

(Related Art)

FIG. 5

(Related Art)

BACKLIGHT UNIT AND LIQUID CRYSTAL DISPLAY USING THE SAME

This application claims the benefit of Korea Patent Application No. 10-2008-0014657 filed on Feb. 18, 2008, which is incorporated herein by reference for all purposes as if fully set forth herein.

BACKGROUND OF THE INVENTION

1. Field of the Invention

This document relates to a backlight unit and, more particularly, to a backlight unit which can reduce vibration and noise of a bottom cover and a liquid crystal display using the same.

2. Description of the Related Art

The liquid crystal display (LCD) has been increasingly used in a wide variety applications because of the associated characteristics such as light-weight, thinness, and low power consumption during driving. Following this trend of increasing use, the liquid crystal display has employed in such devices as office automation devices, and audio/video devices. An LCD displays desired images on a screen by controlling the intensity of a light beam applied to a plurality of control switches arranged in matrix.

Liquid crystal displays are not self-luminous and therefore LCD devices require a light source such as a backlight.

Backlight units for the liquid crystal display can be broadly classified as either direct lighting types or an edge lighting types. In the edge lighting type, a light source is disposed at the outer block of a flat panel, and light emitted from the light source is incident on the entire surface of a liquid crystal display panel using a transparent light guide plate. In the direct lighting type, a light source is disposed on the rear surface of a liquid crystal display panel, and the entire surface of the liquid crystal display panel is directly radiated. The direct lighting type is advantageous when compared with the edge light type in that it can deliver increased luminance and can distribute light unto a wide light-emitting surface since several light sources are used. In the case of an LCD TV employing a large-sized liquid crystal display panel, the backlight unit of the direct lighting type is generally adopted.

Figure 1:
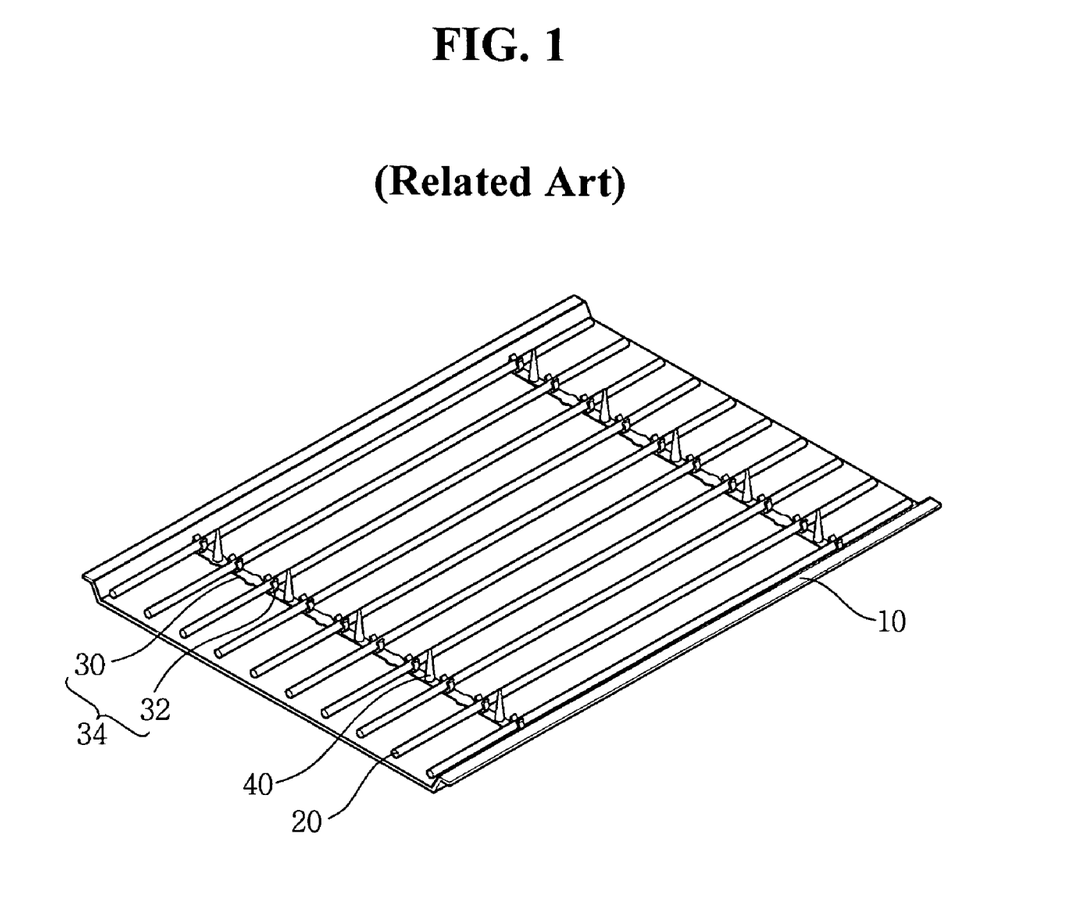
FIG. 1 is a perspective view showing a part of a backlight unit according to the related art.
Figure 2:
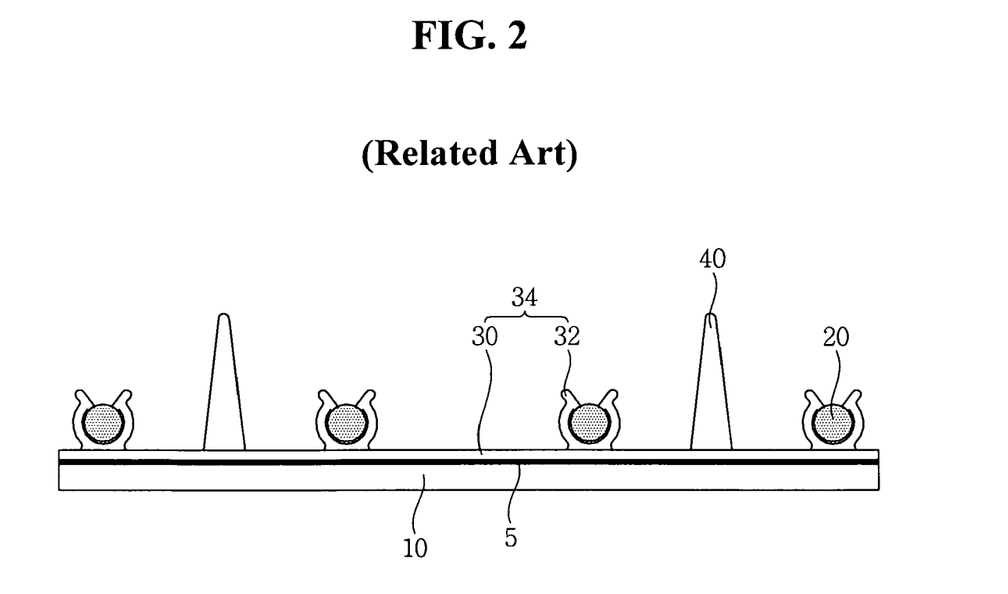
FIG. 2 is a cross-sectional view showing one side of the backlight unit of FIG. 1.

As shown in FIGS. 1 and 2, the backlight unit of a direct lighting type of the related art includes, a plurality of lamps 20 for illuminating light to a liquid crystal display panel (not shown), lamp guides 34 for supporting the lamps 20, a bottom cover 10 for accommodating the lamps 20 and the lamp guides 34, a diffusion sheet (not shown) disposed to cover the entire surface of the bottom cover 10 and configured to spread light incident from the plurality of lamps, and a plurality of optical sheets (not shown) stacked over the diffusion sheet and functioning to vertically raise a light travel path toward the liquid crystal display panel.

The bottom cover 10 is equipped with a bottom surface, an inclined face that extends at an angle away which from the bottom surface and then extends, and a wing face, which is extends at an angle from the inclined face. The bottom cover 10 accommodates the lamps 20, and the lamp guides 34 for supporting the lamps 20. Each of the lamp guides 34 includes a lamp holder 32 and a frame member 30. The lamp holder 32 is supported by the frame member 30 that is coupled to the bottom surface of the bottom cover 10. The lamp holder 32 and frame member function to fix the lamps 20 to the bottom cover 10. A diffusion sheet support 40 is coupled to the frame member 30 to prevent the diffusion sheet from sagging due to heat of the lamps 20. A reflection sheet 5 is attached to the bottom surface and to the inclined face of the bottom cover 10. The reflection sheet 5 functions to reflect light that travels from the plurality of lamps 20 toward the bottom cover 10, redirecting the reflected light toward the liquid crystal display panel to thus improve the efficiency of light illuminated on the liquid crystal display panel.

Figure 3:
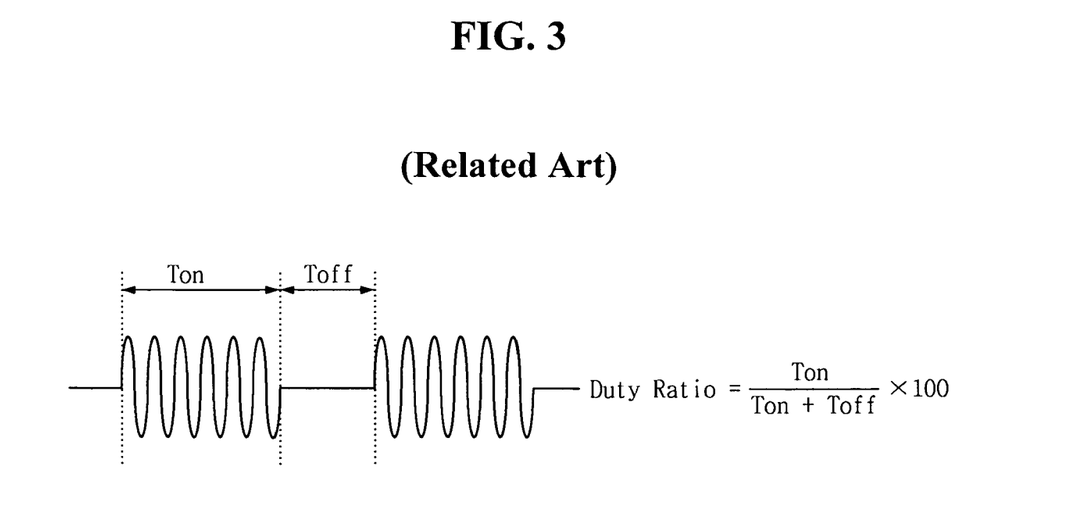
FIG. 3 is a waveform showing an output signal of an inverter.

The lamp 20 generally employs a cold cathode fluorescent lamp (hereinafter referred to as "CCFL") or an external electrode fluorescent lamp (hereinafter referred to as "EEFL"). A high voltage AC signal generated through an inverter (not shown) is applied to the lamp 20. A high voltage-side electrode of the lamp 20 is connected to the inverter through a lamp wire (not shown), and a low voltage-side electrode of the lamp 20 is grounded. The lamp 20 emits light when supplied intermittently with the output signal of the inverter through the lamp wire, as shown in FIG. 3. The duty ratio of the output signal of the inverter is controlled in response to a burst dimming signal generated from a dimming circuit (not shown). The duty ratio of the output signal of the inverter is Ton×100/(Ton+Toff), where 'Ton' denotes a turn-on period of the lamp 20 and 'Toff' denotes a turn-off period of the lamp 20. The duty ratio of the output signal determines the luminance of the lamp 20.

Figure 4:
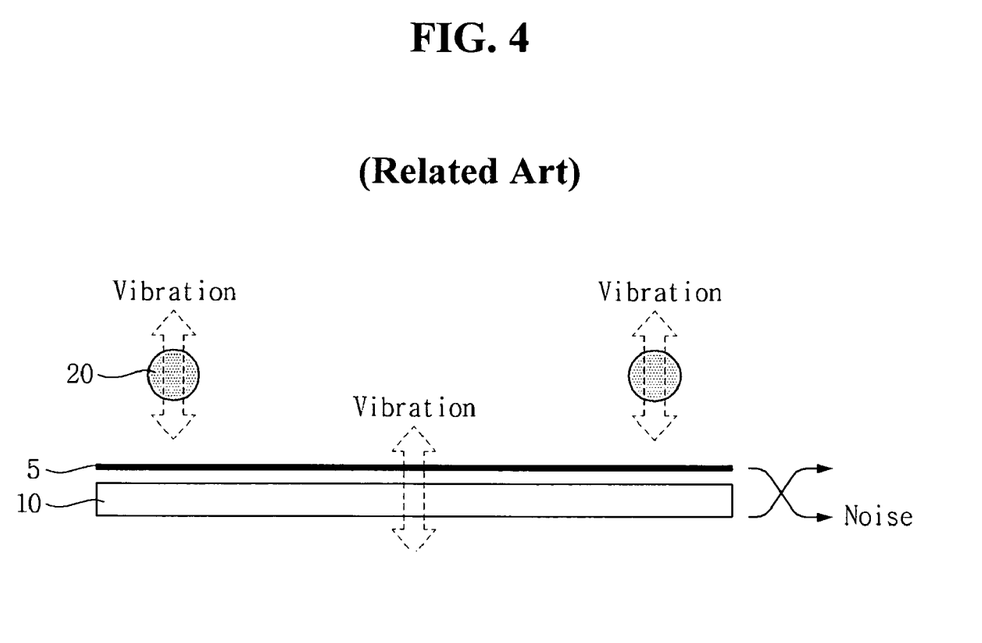
FIG. 4 is a view illustrating that vibration and noise of a bottom cover occur due to shaking of a lamp.
Figure 5:
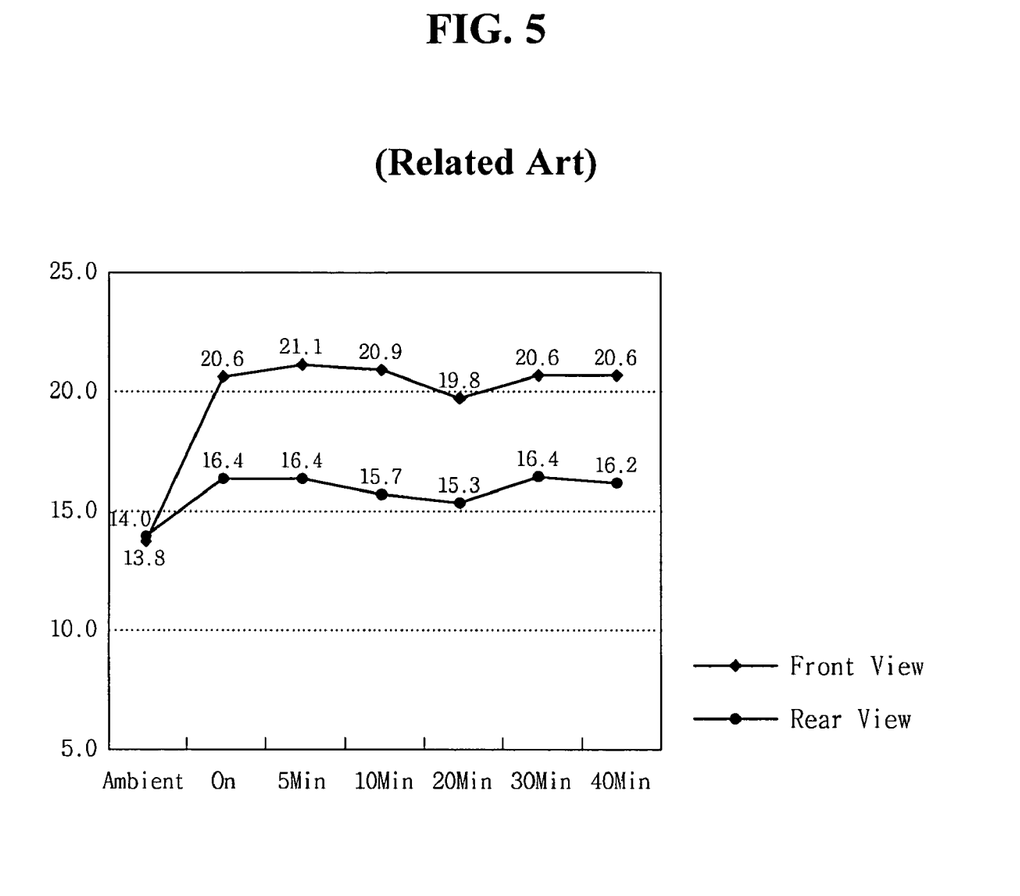
FIG. 5 is a graph showing the results of an experiment in which vibration and noise of a related art liquid crystal display were measured.

However, when the lamps 20 are operated based on the output signal of the inverter as described above, an AC signal of a high voltage is intermittently applied to the high voltage-side electrodes of the lamps 20, so that the lamps 20 are subject to micro vibration due to a periodical variation in the supplied energy, as shown in FIG. 4. The lamps 20 are fixed to the bottom cover 10 through the lamp holder and, therefore, the vibration of the lamps 20 is transferred to the bottom cover 10 substantially unchanged. The vibration of the bottom cover 10 generates noise as shown in FIG. 5. The generated noise is greater on the front side of the liquid crystal display having an exposed liquid crystal display panel than is the generated noise on the rear side of the liquid crystal display that is fully sealed by the back cover. Further, the problem of generation of noise due to vibration of the bottom cover 10 increases as a gap between the lamps 20 and the bottom cover 10 is reduced to produce a slim, wide-screen liquid crystal display.

SUMMARY OF THE INVENTION

Accordingly, the present invention is directed to a backlight unit and liquid crystal display using the same that substantially obviates one or more of the problems due to limitations and disadvantages of the related art An advantage of the present invention is to provide a backlight unit which can reduce vibration of a bottom cover, which is caused by shaking of a lamp, and noise accordingly, and a liquid crystal display using the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit includes a plurality of lamps, each having a first electrode and a second electrode, wherein an alternating current (AC) signal having a high voltage is intermittently applied to the first electrode and the second electrode is connected to a ground; a bottom cover for accommodating the lamps and a pair of lamp guides; and a plurality of shock-absorbing holes formed in a bottom surface of the bottom cover near the first electrodes, a length of each shock-absorbing hole extending parallel to a corresponding one of the lamps.

The lamp guide pair comprises a first lamp guide and a second lamp guide, wherein the first lamp guide supports the lamps and is disposed to cross the lamps near the first electrodes, and the second lamp guide is disposed to cross the lamps near the second electrodes.

The shock-absorbing holes are formed to expose vertical cross areas of the lamps and the first lamp guide, respectively, toward a rear surface of the bottom cover.

Each of the shock-absorbing holes has a width the same as or larger than a diameter of the lamp.

Each of the shock-absorbing holes may have a square shape or a slot shape.

In another aspect of the present invention, a liquid crystal display includes a backlight unit having a plurality of lamps, each having a first electrode and a second electrode, wherein an AC signal of a high voltage is intermittently applied to the first electrode and the second electrode is connected to a ground; a bottom cover for accommodating the lamps and a pair of lamp guides; and a plurality of shock-absorbing holes formed in a bottom surface of the bottom cover near the first electrodes in parallel to the lamps; and a liquid crystal display panel for displaying images by employing light incident from the backlight unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the FIGS. 6-11 of the accompanying drawings.

Figure 6:
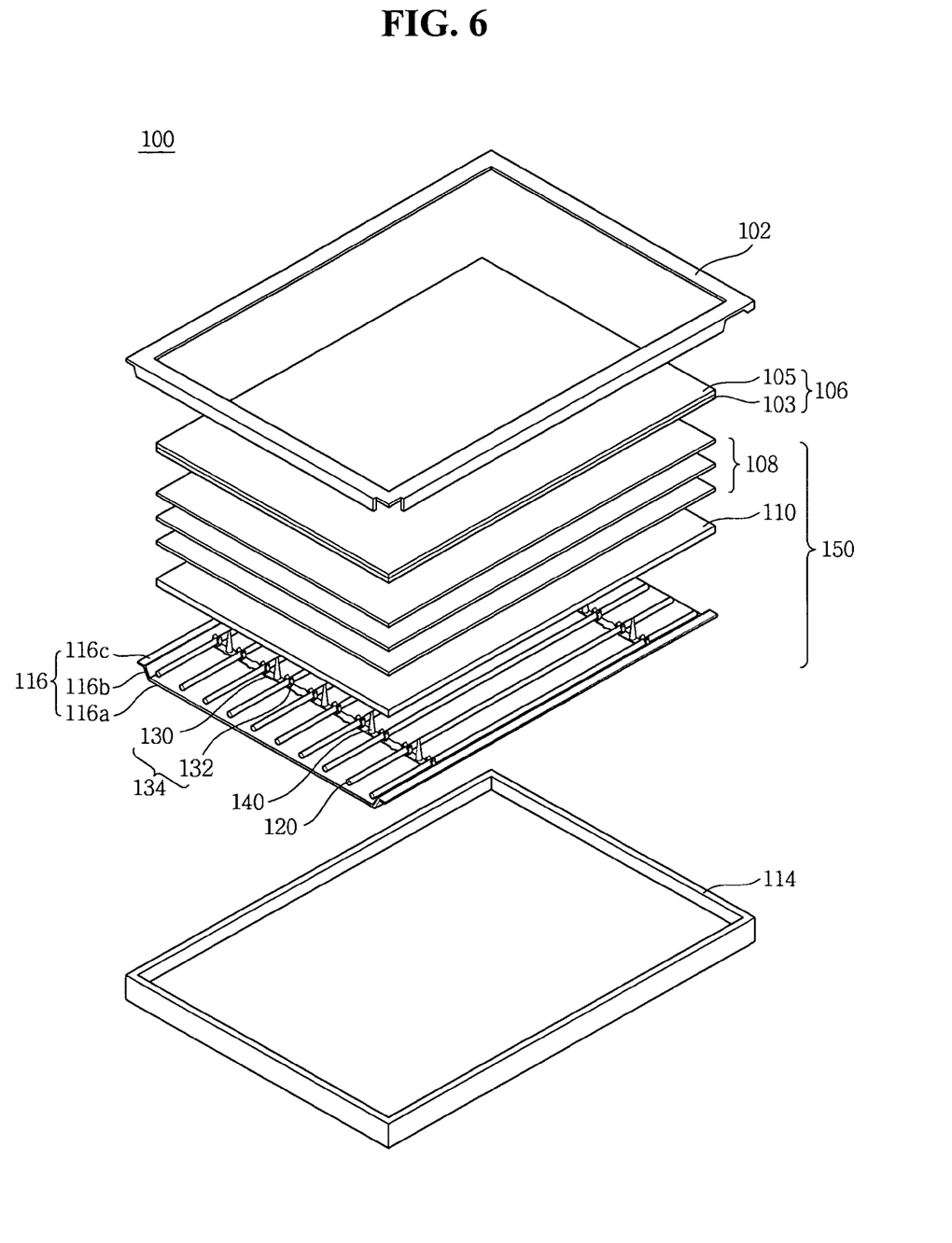
FIG. 6 is an exploded perspective view of a liquid crystal display in accordance with an embodiment of the invention.
Figure 7:
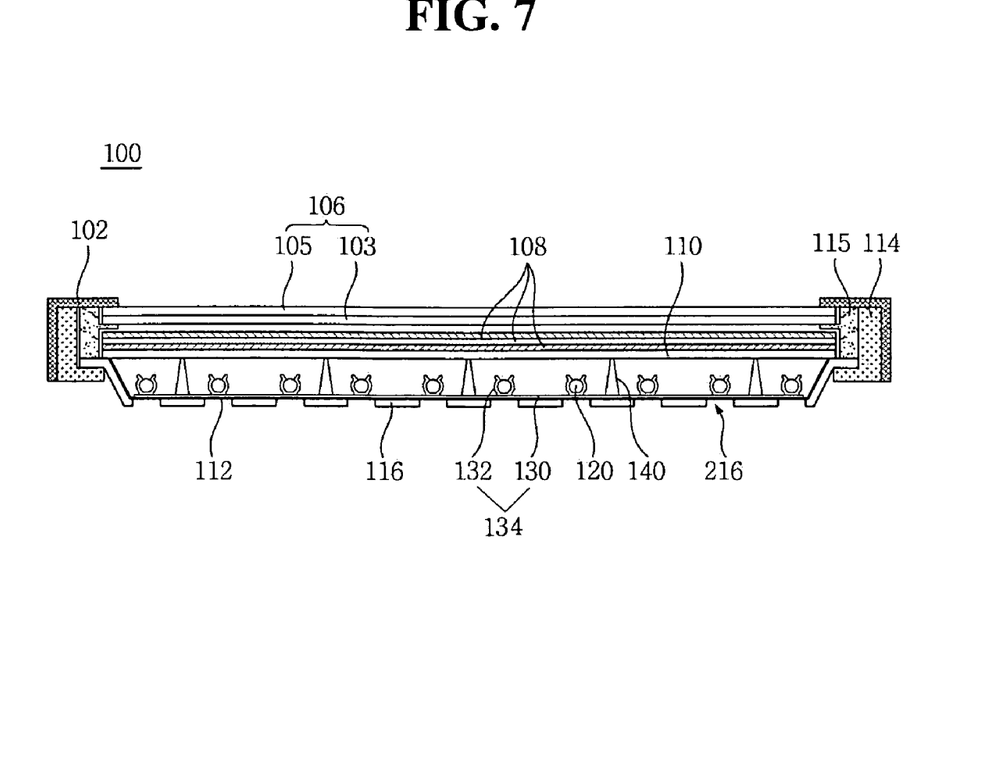
FIG. 7 is a cross-sectional view showing one side of the liquid crystal display shown in FIG. 6 in an assembly state.
Figure 8:
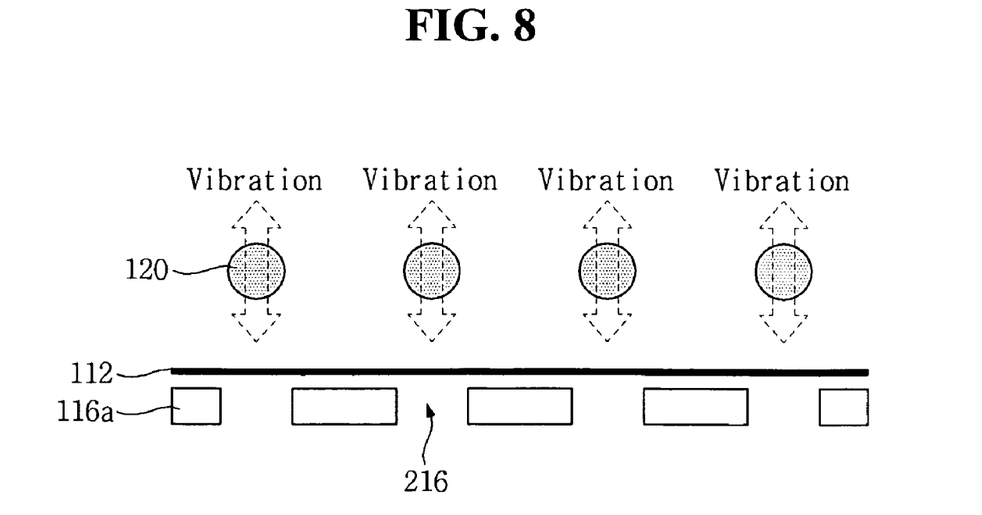
FIG. 8 is view showing shock-absorbing holes formed in a bottom surface of the bottom cover in order to mitigate that the bottom cover is vibrated due to micro vibration of a lamp.

FIG. 6 is an exploded perspective view of a liquid crystal display in accordance with an embodiment of the invention. FIG. 7 is a cross-sectional view showing one side of the liquid crystal display shown in FIG. 6 in an assembly state. FIG. 8 is view showing shock-absorbing holes formed in a bottom surface of the bottom cover in order to mitigate vibration of the bottom cover due to micro vibration of a lamp.

Referring to FIGS. 6 and 7, a liquid crystal display 100 in accordance with an embodiment of the invention includes a support main 114, a backlight unit 150, and a liquid crystal display panel 106 stacked within the support main 114, and a top casing 102 for surrounding the edges of the liquid crystal display panel 106 and the lateral portions of the support main 114.

The liquid crystal display panel 106 includes liquid crystal intervened between a front substrate 105 and a rear substrate 103, and spacers for maintaining a gap between the front substrate 105 and the rear substrate 103. A color filter and a black matrix are formed in the front substrate 105 of the liquid crystal display panel 106. Signal lines, such as data lines and gate lines, are formed in the rear substrate 103 of the liquid crystal display panel 106. A thin film transistor (hereinafter referred to as a "TFT") is formed at crossings of the data lines and the gate lines. The TFT switches a data signal to transmit the data signal from the data line to a liquid crystal cell, in response to a scan signal gate pulse transmitted from the gate line. A pixel electrode is formed in a pixel area between the data line and the gate line. Further, pad regions to which the data lines and the gate lines are respectively coupled are formed in one side of the rear substrate 103. A tape carrier package (not shown) in which a driver integrated circuit for applying a driving signal to the TFT is mounted is attached to each pad region. The tape carrier package supplies a data signal, transmitted from the driver integrated circuit, to the data lines and also supplies a scan signal to the gate lines. An upper polarization sheet is attached to the front substrate 105 of the liquid crystal display panel 106, and a lower polarization sheet is attached to the rear substrate 103 of the rear substrate 103.

The support main 114 is made of molded material and has inner lateral wall faces molded to have a short-stepped jaw. The backlight unit 150 for illuminating light to the liquid crystal display panel 106, and the liquid crystal display panel 106 are stacked on the short-stepped jaw.

The backlight unit 150 includes a plurality of lamps 120 for illuminating light to the liquid crystal display panel 106, lamp guides 134 for fixing and supporting the lamps 120, a bottom cover 116 for accommodating the lamps 120 and the lamp guides 134, a diffusion sheet 110 which is disposed to cover the entire surface of the bottom cover 116 and functions to spread light incident from the lamps 120 and irradiate the liquid crystal display panel 106, and a plurality of optical sheets 108 stacked over the diffusion sheet 110 and configured to vertically stand an incident light travel path toward the liquid crystal display panel 106.

The lamps 120 can be any one of the CCFL and the EEFL types. Each of the lamps 120 includes a glass tube and a high voltage-side electrode and a low voltage-side electrode installed at both ends of the glass tube. The inside of the glass tube is filled with inert gases, and phosphor material is coated on the inner wall of the glass tube. An AC signal of a high voltage supplied to the lamps 120 is generated through an inverter (not shown). The high voltage-side electrode of the lamp 120 is coupled to the inverter through a lamp wire, and the low voltage-side electrode of the lamp 120 is grounded. The lamp 120 emits light when an output signal from the inverter is intermittently supplied through the lamp wire, as shown in FIG. 3. The output signal of the inverter has its duty ratio controlled by a burst dimming signal generated from a dimming circuit. The duty ratio of the output signal of the inverter is Ton×100/(Ton+Toff), where 'Ton' denotes a turn-on period of the lamp 120 and 'Toff' denotes a turn-off period of the lamp 120. The duty ratio of the output signal determines the luminance of the lamp 120. In the case in which the lamp 120 is operated based on the output signal of the inverter as described above, an AC signal of a high voltage is intermittently supplied to the high voltage-side electrode of the lamp 120, and the lamp 120 is subject to micro vibration due to the periodic abrupt change in energy supplied to the lamp 20, as shown in FIG. 8.

Referring again to FIGS. 6 and 7, the bottom cover 116 includes a bottom surface 116a, an inclined face 116b that extends at an angle away the bottom surface 116a, and a wing face 116c that extends at an angle from the inclined face 116b. The bottom cover 116 accommodates the lamps 120 and the lamp guides 134 for supporting the lamps 120. A plurality of shock-absorbing holes 216 is formed in the bottom surface 116a of the bottom cover 116 in parallel to the lamps 120 and functions to mitigate vibration of the bottom cover 116 due to micro vibration of the lamps 120. The shock-absorbing holes 216 will be described in detail with reference to FIGS. 9 and 10. The lamp guides 134 are arranged in pairs between the bottom cover 116 and the lamps 120, and each lamp guide includes lamp holders 132 and a frame member 130. The lamp holders 132 are supported and coupled by the frame member 130 to the bottom surface of the bottom cover 116 and fix the lamps 120 to the bottom cover 116. A plurality of diffusion sheet supports 140 is coupled to the frame members 130, so that the diffusion sheet can be prevented from sagging due to heat of the lamps 120.

A reflection sheet 112 functions to reflect light that travels from the plurality of lamps 120 toward the bottom cover 116, redirecting the reflected light toward the liquid crystal display panel 106 to thus improve the efficiency of light illuminated on the liquid crystal display panel 106.

The diffusion sheet 110 is seated on the diffusion sheet supports 140. The diffusion sheet 110 spreads light incident from the plurality of lamps 120, thereby making uniform the distributions of light directed onto the liquid crystal display panel 106. The diffusion sheet 110 includes an optical spreading member coated on both sides of a film made of transparent resin. The diffusion sheet 110 is supported by the diffusion sheet supports 140 and therefore does not sag downwards under the influence of gravity and heat of the lamps.

A panel guide 115 is seated on the wing face 116c of the bottom cover 116. The panel guide 115 includes a seating portion having a rectangular belt on which the liquid crystal display panel 106 is seated, and supports the liquid crystal display panel 106.

The plurality of optical sheets 108 stacked over the diffusion sheet 110 redirects light incident from the diffusion sheet 110 to be incident perpendicular to the liquid crystal display panel 106, thus improving optical efficiency. To this end, the optical sheets 108 include two sheets of prism sheets and two sheets of spreading sheets. The two sheets of prism sheets stand a travel angle of spreading light, emitted from the diffusion sheet 110, in a direction vertical to the liquid crystal display panel 106. The two sheets of spreading sheets spread the vertically incident light again.

The top casing 102 is formed in a rectangular belt having a plan portion and a lateral portion, which are curved at a right angle to each other and surrounds the corners of the liquid crystal display panel 106 and the sides of the support main 114.

Figure 9:
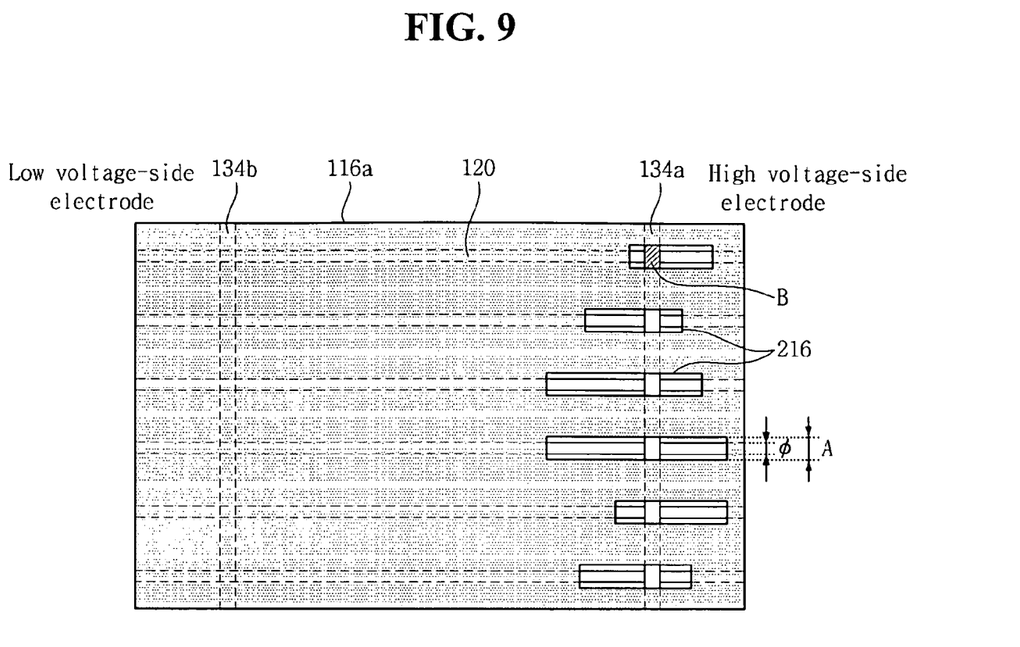
FIG. 9 is a plan view showing the rear surface of the bottom cover in which the shock-absorbing holes are formed.
Figure 10:
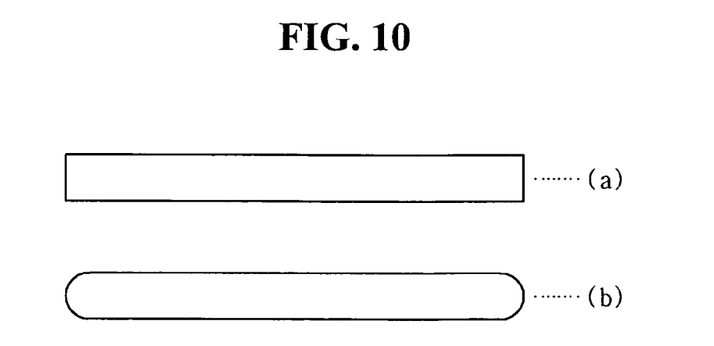
FIG. 10 is a view showing a variety of shapes of the shock-absorbing holes.

FIG. 9 is a plan view showing the rear surface of the bottom cover in which the shock-absorbing holes are formed. FIG. 10 is a view showing a variety of shapes of the shock-absorbing holes.

Referring to FIG. 9, the shock-absorbing holes 216 are formed in the bottom surface 116a of the bottom cover 116 and extend parallel to the lamps 120. In particular, the shock-absorbing holes 216 are parallel to the tubes of lamps 120 in regions near the high voltage-side electrodes of the lamps 120 and prevent perpendicular cross areas B of a first lamp guide 134a, which perpendicularly crosses the lamps 120, from directly coming into contact with the bottom surface 116a of the bottom cover 116. Using the shock-absorbing holes 216 to prevent the vertical cross areas B of the first lamp guide 134a from directly coming into contact with the bottom surface 116a of the bottom cover 116 mitigates vibration of the bottom cover 116 due to shaking of the lamps 120 by preventing micro vibration of the lamps 120 from being directly transferred to the bottom surface 116a of the bottom cover 116 vertically. Further, the shock-absorbing holes 216 are formed in the regions close to the high voltage-side electrodes of the lamps 120 because is that micro vibration is generated more strongly at the high voltage-side electrodes to which an AC signal of a high voltage is intermittently supplied from the inverter than at the low voltage-side electrodes to which a ground voltage is consistently supplied. The greater generation of micro vibration at the high voltage-side electrodes is caused by a more abrupt change of energy in the high voltage-side electrodes because of the AC signal of a high voltage that is intermittently supplied.

Meanwhile, in order to effectively mitigate vibration of the bottom cover 116 due to shaking of the lamp 120, a vertical width A of each shock-absorbing hole 216 may be at least the same as or larger than a diameter $\phi$ of the lamp 120. The length of the shock-absorbing holes 216 extending along the lamp (120) line can be varied and the shape of the shock-absorbing holes 216 can also be varied. For example, the shape of the shock-absorbing holes 216 may have a rectangular shaped cross section as shown in shape (a) of FIG. 10. Alternatively, the shock absorbing hole 216 may have and a slot shape as shown in shape (b) of FIG. 10.

The shock-absorbing holes 216 in the illustrated embodiment are not formed near the vertical cross areas of a second lamp guide 134b that perpendicularly crosses the lamps 120 near the low voltage-side electrodes of the lamps 120. However, the shock-absorbing holes 216 may also be formed near the vertical cross areas at the second lamp guide 134b, if appropriate. The shock absorbing holes may be omitted near the low voltage-side electrodes because the low voltage-side electrodes are vibrated relatively weakly under the influence of vibration of the high voltage-side electrodes.

Figure 11:
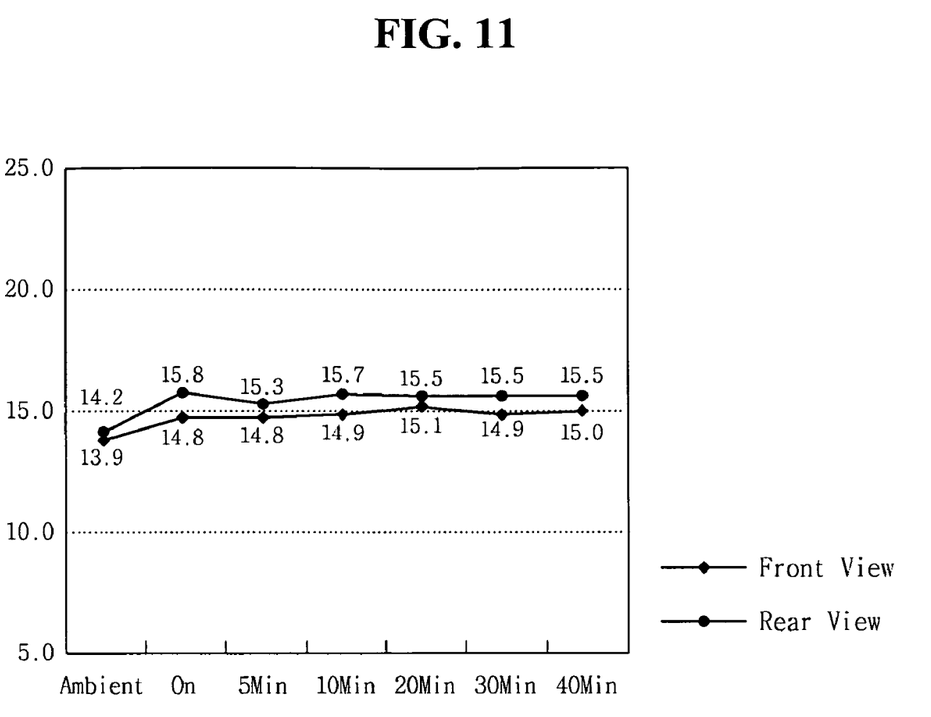
FIG. 11 is a graph showing the results of an experiment in which vibration and noise of the liquid crystal display in accordance with an embodiment of the invention were measured.

FIG. 11 is a graph showing the results of an experiment in which vibration and noise of the liquid crystal display in accordance with an embodiment of this invention were measured. In FIG. 11, an abscissa axis denotes measured time (min) and a vertical axis denotes vibration and noise (dB).

From FIG. 11, it can be seen that vibration and noise of the bottom cover, which were greatly generated over the entire surface of the related art liquid crystal display, are mitigated significantly since vibration of the bottom cover is greatly mitigated by the shock-absorbing holes formed in the bottom surface of the bottom cover.

As described above, according to the backlight unit and the liquid crystal display using the same in accordance with an embodiment of the invention, the shock-absorbing holes are formed in the bottom surface of the bottom cover in parallel to the lamps. Accordingly, vibration of the bottom cover, which is generated in conjunction with shaking of the lamps, can be mitigated, and therefore vibration and noise of the bottom cover can be reduced significantly.

It will be apparent to those skilled in the art that various modifications and variation can be made in the present invention without departing from the spirit or scope of the invention. It is to be understood that invention is not limited to the disclosed embodiments. Thus, it is intended that the present invention cover the modifications and variations of this invention provided they come within the scope of the appended claims and their equivalents.

What is claimed is:

1. A backlight unit, comprising:
    a plurality of lamps, each having a first electrode and a second electrode, wherein an alternating current (AC) signal having a high voltage is intermittently applied to the first electrode and the second electrode is connected to a ground;
    a bottom cover for accommodating the lamps and a pair of lamp guides; and
    a plurality of shock-absorbing holes formed in a bottom surface of the bottom cover near the electrodes, a length of each shock-absorbing hole extending parallel to a corresponding one of the lamps,
    wherein the lamp guide pair comprises a first lamp guide and a second lamp guide, wherein the first lamp guide supports the lamps and is disposed to cross the lamps near the first electrodes, and the second lamp guide is disposed to cross the lamps near the second electrodes,
    wherein each of the shock-absorbing holes is formed to expose a first vertical cross area of the first lamp guide and the lamps or to expose a second vertical cross area of the second lamp guide and the lamps at a rear surface of the bottom cover.

2. The backlight unit of claim 1, wherein each of the shock-absorbing holes has a width that is equally to or larger than a diameter of the corresponding lamp.

3. The backlight unit of claim 1, wherein each of the shock-absorbing holes has one of a rectangular shape and a slot shape.

4. A liquid crystal display, comprising:
    a backlight unit having a plurality of lamps, each having a first electrode and a second electrode, wherein an AC signal of a high voltage is intermittently applied to the first electrode and the second electrode is connected to a ground, a bottom cover for accommodating the lamps and a pair of lamp guides, and a plurality of shock-absorbing holes formed in a bottom surface of the bottom cover near the electrodes in parallel to the lamps; and
    a liquid crystal display panel for displaying images by employing light incident from the backlight unit,
    wherein the lamp guide pair comprises a first lamp guide and a second lamp guide, wherein the first lamp guide supports the lamps and is disposed to cross the lamps near the first electrodes, and the second lamp guide is disposed to cross the lamps near the second electrodes,
    wherein each of the shock-absorbing holes is formed to expose a first vertical cross area of the first lamp guide and the lamps or to expose a second vertical cross area of the second lamp guide and the lamps at a rear surface of the bottom cover.

5. The liquid crystal display of claim 4, wherein each of the shock-absorbing holes has a width that is equally to or larger than a diameter of the corresponding lamp.

6. The liquid crystal display of claim 4, wherein each of the shock-absorbing holes has one of a rectangular and a slot shape.

* * * * *